US005765205A

United States Patent [19]

Breslau et al.

[11] Patent Number: 5,765,205
[45] Date of Patent: Jun. 9, 1998

[54] METHOD AND SYSTEM FOR ON-DEMAND SOFTWARE DISTRIBUTION

[75] Inventors: Franklin Charles Breslau. Teaneck, N.J.; Paul Gregory Greenstein, Croton-On-Hudson; John Ted Rodell, Wappingers Falls, both of N.Y.

[73] Assignee: International Business Machines Corporation, Armonk, N.Y.

[21] Appl. No.: 579,541

[22] Filed: Dec. 27, 1995

[51] Int. Cl.$^6$ ................................................ G06F 12/08
[52] U.S. Cl. .............................. 711/203; 395/200.46
[58] Field of Search ..................... 395/200.03, 200.07, 395/413, 492, 200.46; 711/203, 204, 165

[56] References Cited

U.S. PATENT DOCUMENTS 5,619,656  4/1997  Graf .................................. 395/200.11
5,649,140  7/1997  Duvalsaint ......................... 395/413

OTHER PUBLICATIONS

Peterson, "Operating System Concepts", ISBN 0-201-06097-3, pp. 193-198, 1983.
Custer "Inside Windows NT", ISBN 1-55615-481-X, pp. 182-184, 288-299, 1993.

*Primary Examiner*—Tod R. Swann
*Assistant Examiner*—Christopher Chow
*Attorney, Agent, or Firm*—Edward H. Duffield, Esq.; Heslin & Rothenberg, P.C.

[57] ABSTRACT

Techniques are presented for efficiently transferring computer code from a source computer to a target computer for execution on the target computer. A virtual memory space for the computer code is created on the target computer. The computer code is linked on the source computer such that addressing of the resulting executable version of the computer code corresponds to the allocated virtual memory space on the target computer. The executable computer code is then stored in the memory of the source computer. As the target computer executes the computer code, page faults result because its allocated virtual memory space is empty. The memory pages required to remediate the page faults are obtained from the source computer on an on-demand basis. Execution accordingly proceeds.

38 Claims, 10 Drawing Sheets

| ASID | PAGE_ADDRESS | DEVICE_TYPE | DEVICE_# | DEVICE_LOCATION |
|---|---|---|---|---|
| 0001 | FF3C8 | SCSI_DISC | 001 | 1728 |
| ... | ... | ... | ... | ... |
| 0017 | ABD00 | TCP/IP | 1.2.3.4 | — | fig. 4

1

METHOD AND SYSTEM FOR ON-DEMAND SOFTWARE DISTRIBUTION

TECHNICAL FIELD

The present invention relates in general to the transmission and distribution of computer software. More specifically, the present invention relates to a method and system for transferring computer code to a receiving computer on an on-demand basis, and also relates to a paging technique for use in the transfer.

BACKGROUND OF THE INVENTION

As computer technology progresses, the need for techniques that permit different computer users to share each other's programs and information also increases. Advanced computer communications protocols and networking technologies continue to develop in pursuit of such information exchange. However, software products that link individual computer applications and facilitate sharing of programs and data lag behind the rapidly advancing computer hardware and computer networking infrastructures. For example, there is a need for software that enables the distribution of programs to remote computers that do not possess enough storage capacity to maintain local copies of all potentially necessary programs.

One solution to application sharing is the "OPENDOC" standard (a product of work conducted by e.g., "IBM", "APPLE", and "NOVELL" which are all part of the "CIL-ABS" industry consortium) that permits the transfer of an application program from a source computer to a target computer. This transfer may be performed while the application program executes on the source computer, therefore, the application program may be simultaneously used on the target computer. According to "OPENDOC" techniques, the transfer of an application program from a source computer to a target computer necessitates the transfer of the entire application program within the "OPENDOC" environment before any execution begins and the program can even be loaded on the target computer. Therefore, the transfer requires extensive communications bandwidth and is expensive in terms of computer power, network resources and time required for completion. Furthermore, a user of the target computer cannot start using the transferred application program until the transfer is complete.

In certain circumstances, a user may only need to use a small subset of the functions of a program. For example, the user may only require the use of the stock quote function of a securities portfolio program. Unfortunately, according to conventional methods, a program must be transferred in its entirety before any specific function may be used.

The present invention is directed toward improving the efficiency and usability of transferring application programs between computers.

SUMMARY OF THE INVENTION

In a first aspect, the present invention comprises a method for use in transferring computer code from a source computer to a target computer for execution. The source computer and the target computer are coupled, and the method includes requesting transfer of the computer code from the source computer to the target computer. In response to the requesting, the method includes providing the source computer with an image of the computer code, wherein the image is pageable in by the target computer. The providing is performable without the target computer having to execute the program.

As an enhancement, the source computer may have an object code version of the computer code. The providing of the source computer with the image of the computer code may then include linking the object code version of the computer code, on the source computer, to provide the image of the computer code that is pageable in by the target computer. Further, the linking may be performed such that the image has addressing corresponding to a predesignated region of memory within the target computer. More specifically, the source computer may retrieve a starting address of the predesignated region of memory within the target computer, and use the starting address during the linking, such that the image has the addressing corresponding to the predesignated region of memory within the target computer.

As a further enhancement, the method may include executing the computer code on the target computer by on-demand paging in of the image of the program by the target computer from the source computer. During the executing, the entire image may be transferred to the target computer. During the transferring, priority may be given to the transfer of pages of the image corresponding to page faults encountered during the executing. The transferring may include sequentially transferring the entire image to the target computer, one page at a time. If a page fault occurs, a selected next page that resolves the page fault is transferred to the target computer.

In another aspect, the present invention includes a method for transferring computer code from a source computer to a target computer which has a virtual storage manager. The method includes allocating, on the target computer, virtual memory space corresponding to the computer code. The virtual memory space comprises at least one page of memory. An executable version of the computer code is stored in a memory of the source computer and has addressing corresponding to the virtual memory space of the target computer. The method includes accessing, on the target computer, the virtual memory space. During this accessing, the virtual storage manager transfers portions of the executable version from the source computer to the target computer as page faults occur on the target computer.

As an enhancement, the method may further comprise informing the virtual storage manager of the target computer that pages of the executable version are stored on the source computer. The accessing of the virtual storage space more particularly includes executing the executable version on the target computer. During the executing, a page fault is encountered. In response to the page fault, the virtual storage manager requests a selected page of the executable version from the source computer, wherein the selected page cures the page fault. More specifically, the requesting may include looking up an address of the source computer and transmitting a page request block ("PRB") to the source computer using the address. The PRB specifies the selected page. Thereafter, the target computer awaits a page transmission block ("PTB") from the source computer. The PTB includes a response to the PRB which contains the selected page.

In yet another aspect, the present invention includes a method for transferring virtual memory pages to a computer from a paging device, which is coupled to the computer. The method includes storing at least one virtual memory page for the computer on the paging device, wherein the at least one virtual memory page has not been previously paged out by the computer. The method also includes paging the at least one virtual memory page into the computer from the paging device.

Computer systems corresponding to the above-described methods are also disclosed.

To summarize, the techniques of the present invention facilitate a new and useful mechanism for efficiently transferring computer code from a first computer to a second computer. Pages are linked on the source computer such that their addressing corresponds to an allocated virtual memory space on the target computer. As the target computer requires the pages, they are transmitted. Thus, since transfer of memory pages is performed on-demand, bandwidth is conserved and long waiting periods necessary for the transfer of an entire program are obviated. These techniques are particularly useful in the transfer of application programs as it is possible for the source computer to execute the desired application, and concurrently act as an external paging device for a target computer also executing the application (although it is not necessary for the source computer to be executing the program during the transfer techniques disclosed herein). In accordance with this new functionality and increased efficiency, the present invention comprises an advancement in software transmission techniques.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

FIG. 4 is one example of an Auxiliary Storage Manager ("Auxiliary Storage Manager") look-up table for use within an embodiment of the present invention;

DETAILED DESCRIPTION OF THE PREFERRED EMBODIMENT

Through the application of virtual memory concepts, the present invention facilitates the increased efficiency and usability of transferring computer code between computers. During a transfer of, e.g., an application program from a source computer to a target computer, the source computer becomes a virtual memory paging device for the target computer. The source computer creates an image of the computer code corresponding to the application program in its memory. The image is pageable into an allocated, but empty region of virtual memory allocated on the target computer. As the target computer executes the application program and accordingly requires pages of memory within its allocated virtual address space, it retrieves them from the source computer. Thus, only the bandwidth required for transfer of necessary memory pages is used, and execution of the transferred application program may begin much earlier than was heretofore possible. Overall efficiency and usability of the shared application program are therefore increased.

Figure 10:
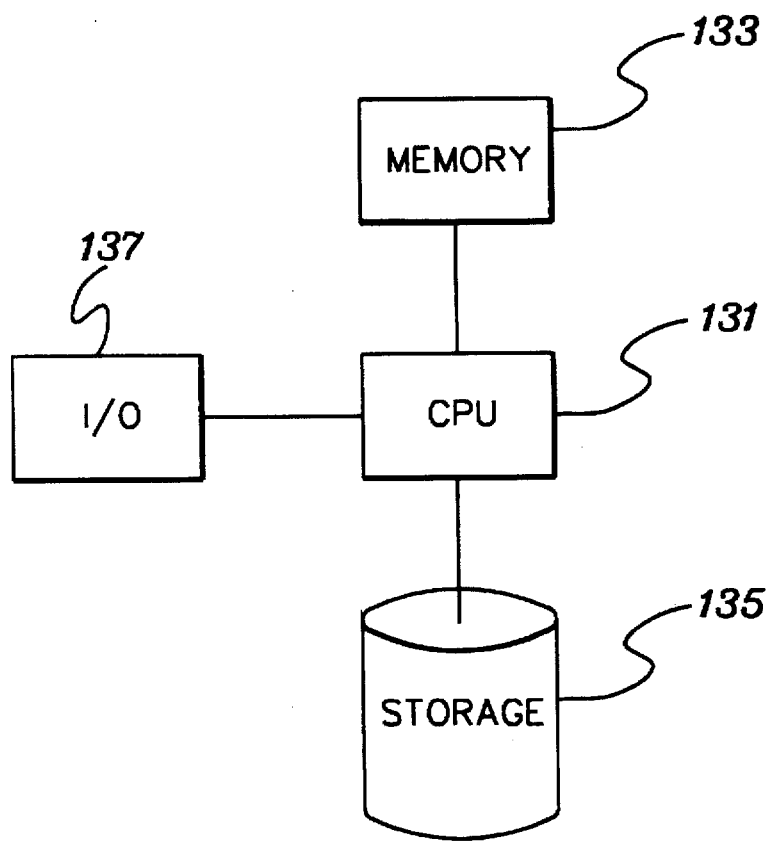
FIG. 10 is a diagram of one embodiment of a computer system useful in implementing the techniques of the present invention.

One embodiment of the hardware elements of a computer system used to carry out the techniques of the present invention are shown in FIG. 10. A central processing unit ("CPU") 241 provides main processing functionality. A memory 243 is coupled to CPU 241 for providing operational storage of programs and data. Memory 243 may include, for example, random access memory ("RAM") or read only memory ("ROM"). Non-volatile storage of, for example, data files and programs is provided by a storage 245 that may include, for example, disk storage. Both memory 243 and storage 245 comprise a computer usable medium that may store computer program products in the form of computer readable program code. User input and output is provided by a user input/output ("I/O") facility 247. User I/O facility 247 may include, for example, a graphical display, a mouse and/or a graphics tablet. As an example, the system of FIG. 10 may comprise an "INTEL" processor based International Business Machines Personal Computer executing an "IBM OS/2 WARP" operating system.

Figure 1:
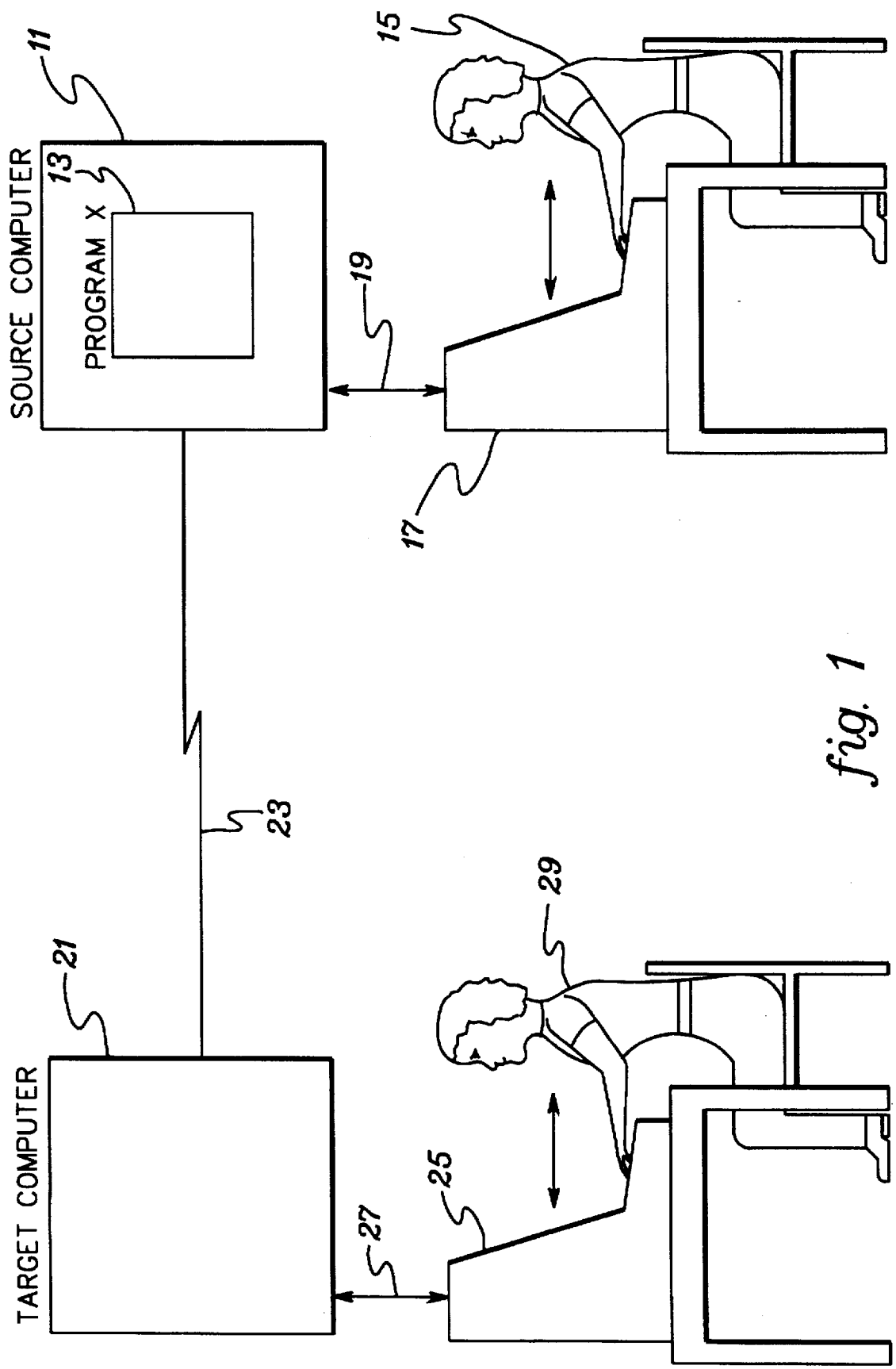
FIG. 1 is a diagram of one example of a network connected source computer and target computer pursuant to one embodiment of the present invention.

In regard to the techniques of the present invention, and as shown in FIG. 1, a source computer 11 has a program X 13 executing thereon. A source user 15 interacts with source computer 11 through source terminal 17. The exact configuration of source terminal 17 will vary with the configuration of the computer system. In one embodiment, source terminal 17 includes a keyboard, mouse and video monitor attached by interconnection 19 to source computer 11 (e.g., an "INTEL" processor based "IBM" personal computer). Alternatively, source terminal 17 could by an X-Station, connection 19 could be a network connection and source computer 11 could be a mainframe computer.

A target computer 21 is coupled to source computer 11 through a network connection 23 that is established using any conventional networking protocol (e.g., Transmission Control Protocol/Internet Protocol—"TCP/IP", "NETBIOS", "IPX" ("NOVELL"), Systems Network Architecture—"SNA") or any other communication path that permits a bi-directional transfer of data (e.g., a direct processor-to-processor connection). A target terminal 25 attaches to target computer 21 through interconnection 27. Target terminal 25 supports a target user 29. Target terminal 25, target computer 21 and interconnection 27 may have several configurations as discussed hereinabove with respect to source terminal 17, source computer 11 and interconnection 19. As one variation, target user 29 (or source user 15) could be another computer program executing on target computer 21.

Figure 2A:
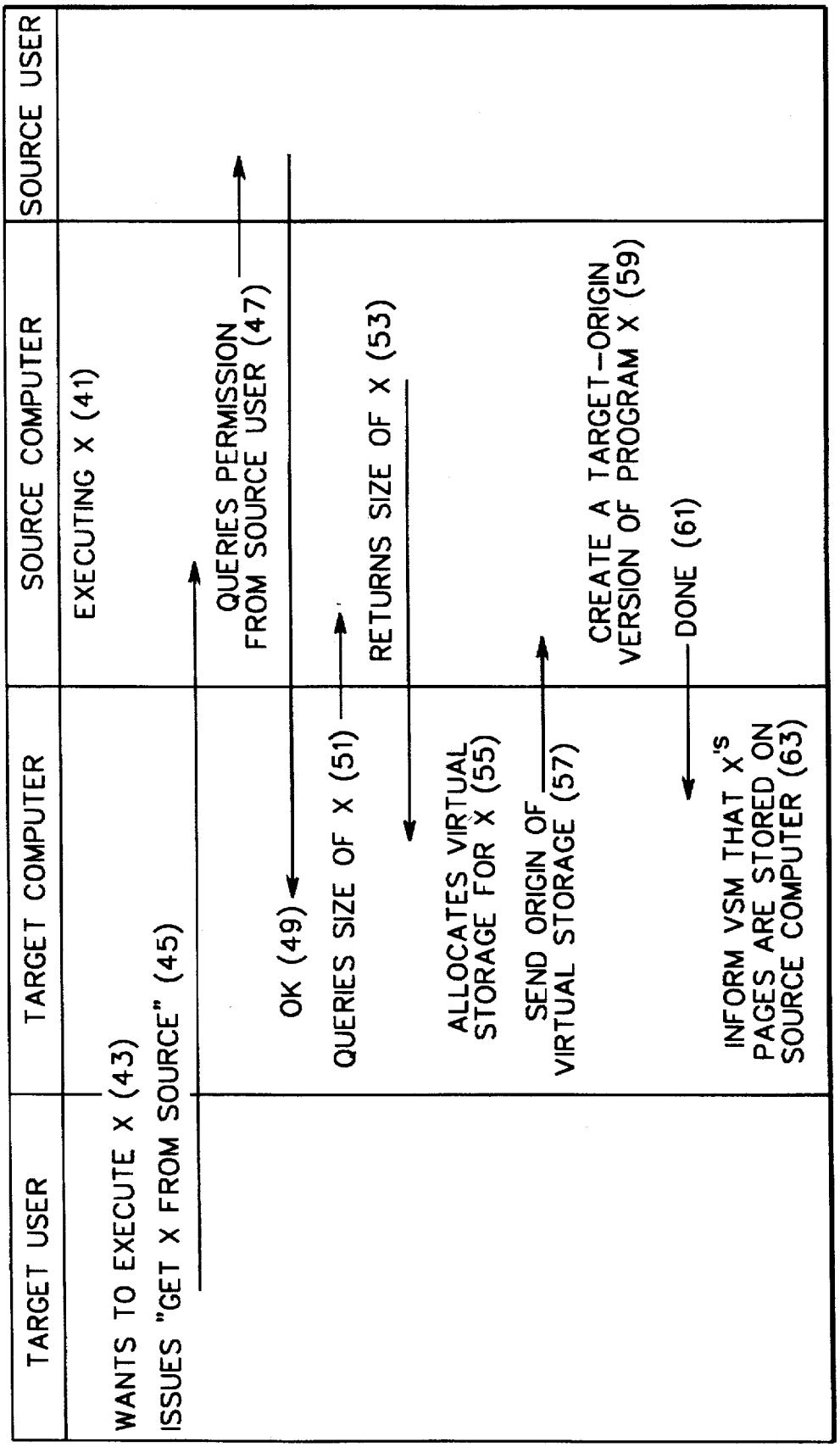
FIGS. 2A–C depict a flow-diagram of a technique for on-demand software distribution according to an embodiment of the present invention.

One embodiment of the process for on-demand transfer of program X from the source computer to the target computer, in accordance with the principles of the present invention, is described in detail below with reference to the flow diagram of FIGS. 2A–2C. Initially, the source user begins using program X on the source computer (step 41). Some time thereafter, the target user decides that he or she wants to use program X (step 43) and issues a command "Run X from <source computer>" to the source computer (step 45). This command may be instantiated from, e.g., a command line or an icon in a graphical user interface ("GUI") environment. (Note: The techniques disclosed herein are equally applicable even if there is no source user using program X; the ability to perform a transfer of the program to the target computer concurrently with a source user using program X is an enhanced feature of the techniques of the present invention).

The "Run X from <source computer>" command is implemented as an extension to the conventional user program invocation mechanism. For example, in an "IBM OS/2 WARP" operating environment, a user may invoke a program by, e.g., entering the program name from a command prompt or double clicking a mouse button on an icon corresponding to the program. Once a user has performed either of these functions, the system will locate the program, load it in memory and start it's execution (i.e. branch to its entry point).

In particular, in one embodiment, an icon is displayed within the user's desktop, and corresponds to the mechanism described hereinbelow used to get a program from the source computer. Associated with the icon is the name of the program to get and the networking address of the source computer. A double click on the icon using a mouse button will then locate, load, and execute the program. As an enhancement, the target user may be prompted for either or both of the name of the program to get and the network address of the source computer when the icon is instantiated.

Resulting from the issuance of the "Run X from <source computer>" command is a following step that determines if the target user (and/or the target computer) is authorized to access and execute program X. A query is presented to the source user at the source terminal (step 47). The query will inform the source user that the target user on the target computer desires usage of program X. The source user then responds to the query. If the source user denies the target user's access request, the target user is so informed and the process terminates. If the source user approves access to program X, this approval is forwarded to the target computer and the process continues (step 49). In an alternate embodiment, permission processing can be removed, or automated using, e.g., a predefined security policy on the source computer.

To accommodate program X, one step the target computer performs is allocating virtual memory space for program X. The target computer queries the source computer for the size of program X (step 51) such that it may allocate the proper amount of virtual memory space. The source computer responds with the size of program X (step 53) and the target computer accordingly allocates the appropriate amount of virtual memory space (step 55). Such allocation is performed using conventional virtual memory management techniques that will vary depending on the particular operating hardware and software. In one embodiment in which the target computer comprises, e.g., an "IBM" Personal Computer executing the "OS/2 WARP" Operating System, the OS/2 Page Manager (also referred to herein as the virtual storage manager ("VSM")) is used to manage virtual memory and may be instructed using conventional techniques to allocate the requisite virtual memory space for program X. VSM's are described in detail in, for example, Designing OS/2 Applications, D. E. Riech, J. Wyley and Son's Inc., 1993, Doc. # ISBN 0-471-58889-X; Inside OS/2 2.1, Minasi, et al., NRP, 1993, ISBN 1-56205-206-3; and MVS/370 System Logic Library, Volume 3, IBM document number LY28-1067-01;, which are incorporated herein by reference in their entireties.

According to the techniques of the present invention, in one example, the VSM of the target computer is passed a new parameter, (e.g., "NOTNEW") informing it that the virtual memory pages will not be initially loaded, but will be retrieved from a remote paging device. Upon detection of this parameter, the VSM sets its internal tables and pointers as though the virtual memory pages have already been loaded, even though they have not. Thus, upon encountering a first page fault, the VSM attempts to retrieve the memory page from a paging device, and does not expect (as it normally would upon a first page fault) that the page will be filled in by a program.

To continue, the origin of the allocated virtual memory space on the target computer is forwarded to the source computer (step 57), which then uses this origin to create a target computer origin version of program X, which is stored on the source computer in its virtual memory pool or in a dataset (step 59). The target computer is notified after this step has been completed (step 61). In one embodiment, creation of an executable version of a program at a designated origin is performable using a conventional relocatable program linkage editor (the target and source computers are assumed compatible in terms of object code). As one example, the object code for program X and the desired origin are input to a linkage editor executing on the source computer. The linkage editor creates an executable version of the program beginning at the designated origin. The resulting executable code is stored within the memory space (e.g., real and/or virtual) of the source computer such that the memory pages associated with the program are accessible in succeeding steps. In, for instance, the "IBM OS/2 WARP" operating system, the linkage editor is included as part thereof.

In response to the target computer being notified that the target origin version of program X has been created and is stored in the memory space of the source computer, a message is sent to the Auxiliary Storage Manager (discussed further hereinbelow) of the target computer informing it that the virtual memory pages for program X are stored on the source computer (step 63). Virtual memory tables used by the Auxiliary Storage Manager of the target computer to identify the source of virtual memory pages are then updated to point to the source computer regarding the memory pages of program X (see, e.g., FIG. 4 and the accompanying discussion below).

Figure 2B:
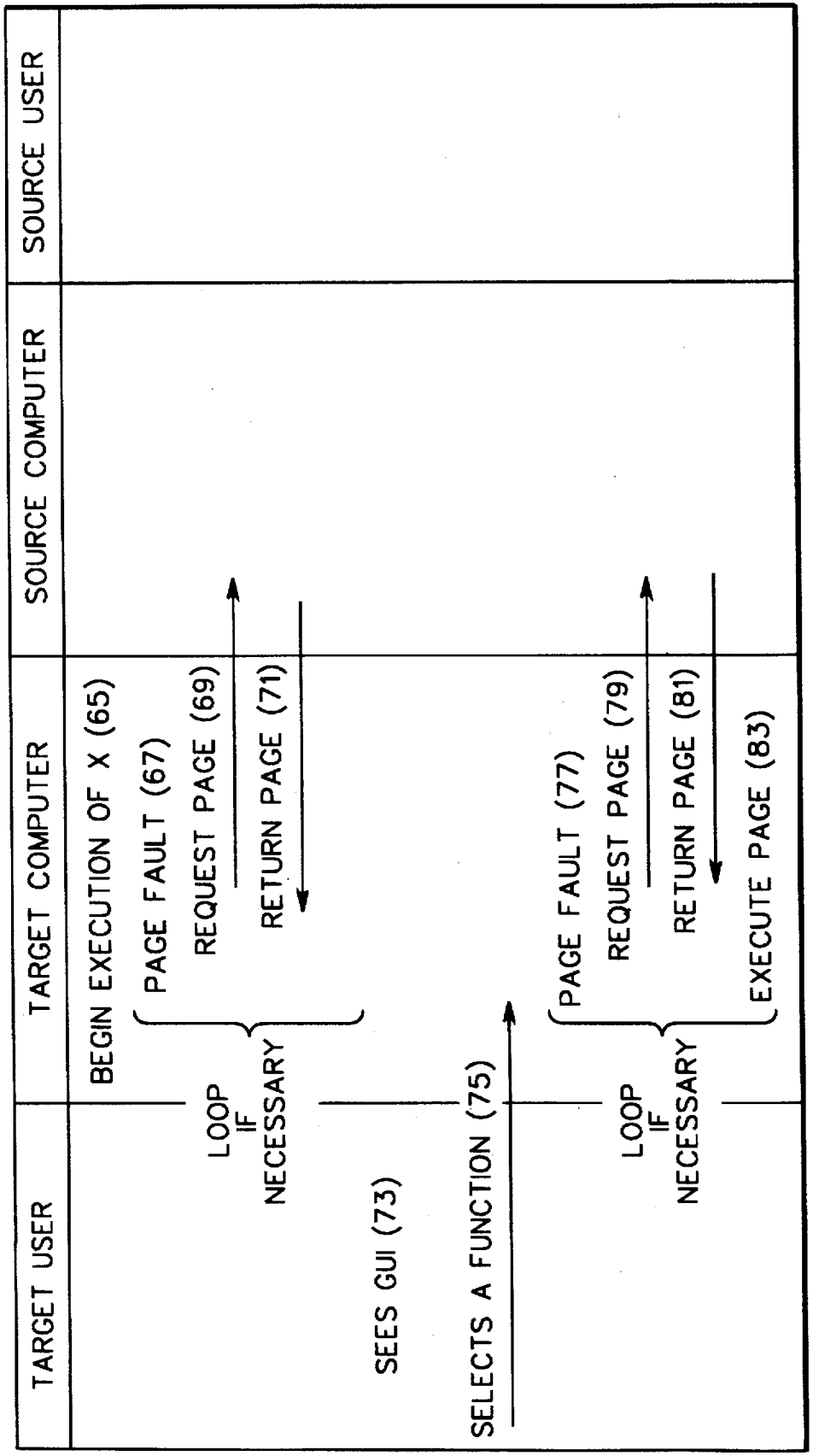

Program X may now begin execution on the target computer (step 65—FIG. 2B). However, since none of program X has been paged into the allocated virtual memory of the target computer, a page fault results upon the instantiation of execution of program X (step 67). The VSM of the target computer responds to the page fault by retrieving the faulted page of memory from the source computer. Specifically, a request is sent (on behalf of the VSM) from the Auxiliary Storage Manager of the target computer to the source computer for the needed page of memory (step 69). The source computer retrieves the requested page of memory from the target computer origin version of program X in its memory and transfers the page to the target computer (step 71). Execution may then proceed. (Further details of the paging process are described below with respect to FIGS. 3–9).

During execution of program X on the target computer, further page faults may occur as execution proceeds into areas of the allocated virtual memory space that have not yet been loaded. As each page fault occurs, the above-described process of the target computer retrieving the necessary memory pages from the source computer continues (steps 67, 69 & 71).

In implementation of the techniques disclosed herein, a first matter that a typical program may attend to is the presentation of an interface (e.g., a GUI) to the user. In such a case, the above described initial execution and memory page loading would result in the memory pages corresponding to the GUI being loaded and the GUI being presented to the target user (step 73). If the target user then selects a function (step 75) from the GUI (e.g., clicks using a mouse on a menu item), whose execution requires accessing a memory page not yet loaded, the above-described process repeats for the required memory pages. Specifically, a page fault occurs (step 77), a request is sent from the target computer to the source computer for the required memory page (step 79), the source computer forwards the required memory page to the target computer (step 81) and execution proceeds.

It is possible that the same memory page may be requested from the source computer more than once. This may happen when, e.g., an unmodified virtual page is paged out, but its contents are simply discarded because it can be retrieved again from the paging device (e.g., source computer). It is also possible that, e.g., the memory page will be paged out to a conventional paging device and subsequent retrieval of the memory page will be from that paging device. Thus, as one variation on the techniques disclosed herein, when a page is written out from the target computer, appropriate Auxiliary Storage Manager tables may be modified such that it is written to a conventional paging device, and not the source computer which was used to bring the page in.

Figure 2C:
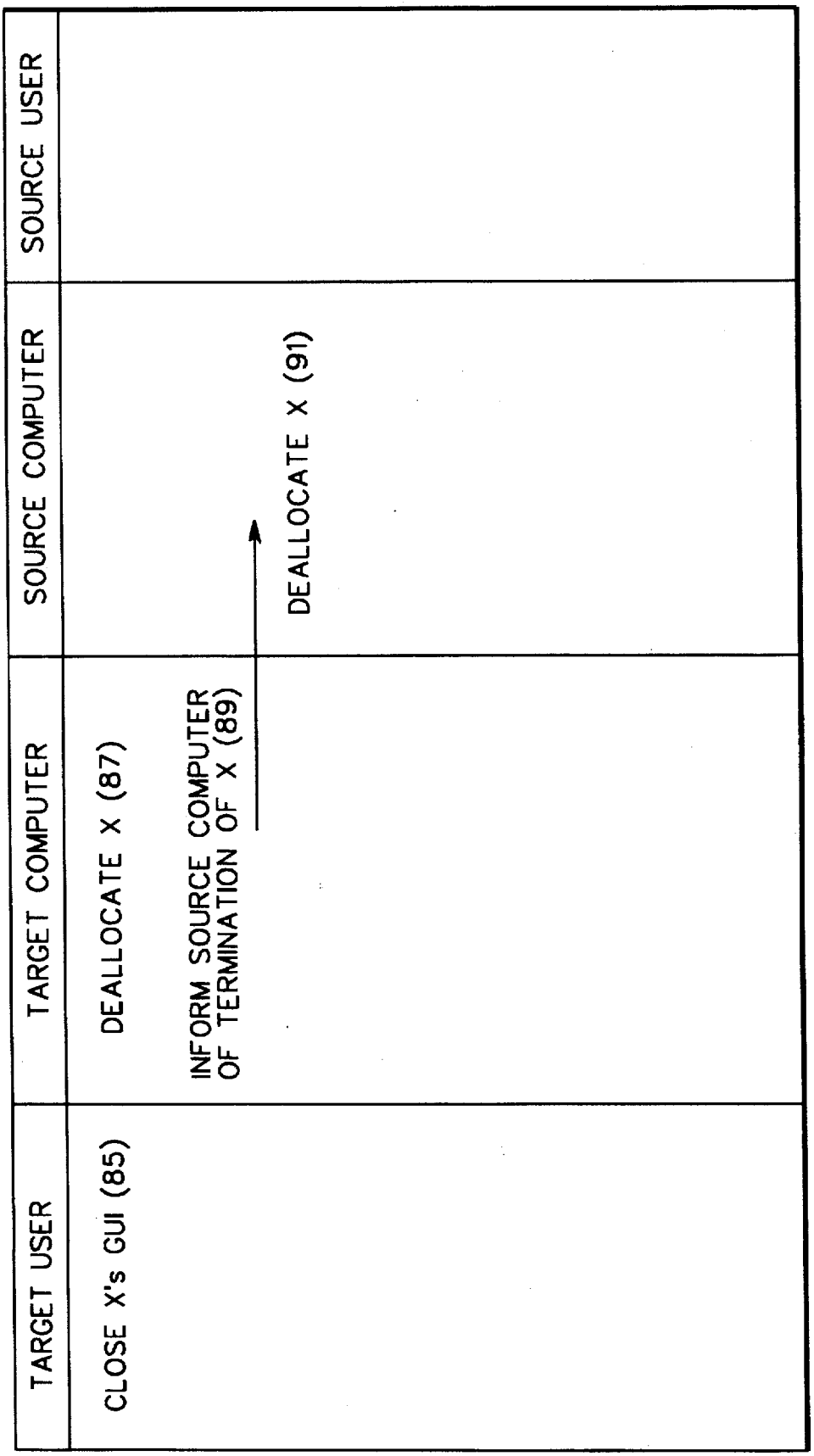

After the target user has completed using program X, he terminates its execution, e.g., by closing a window within program X's GUI (step 85—FIG. 2C). Control is accordingly returned to the invoker of program X's execution which will issue a signal to the system to free the memory occupied by program X. The VSM of the target computer will then deallocate the virtual memory space program X resided in (step 87), thereby terminating the existence of program X on the target computer. After the VSM has freed the virtual memory it will signal the system to make the real pages occupied thereby available for use. Further, the target computer informs the source computer of the termination of usage and deallocation of program X (step 89). In response, the source computer also deallocates the memory that the target computer origin version of program X was stored in (step 91), and the process is completed.

As one variation on the techniques disclosed herein, transmission of all memory pages of program X from the source computer to the target computer may be performed, however, with priority given to any immediately needed memory pages (due to, e.g., page faults). For example, after the target computer begins executing program X, it would, e.g., sequentially begin loading each memory page of the target computer origin version of program X from the source computer. While this loading is occurring, if a page fault occurs on the target computer due to usage of program X by the target user, the transfer of the memory page required to remediate the page fault would be given priority and transferred to the target computer. As a result, the target user will be able to initially use program X without waiting for the entire program to be transferred. After the entire transfer of program X to the target computer, no data transfer delays will exist in accessing any portion of program X.

Further details regarding the techniques for transferring pages of memory between the source computer and the target computer are discussed hereinbelow with reference to FIGS. 3–9.

Figure 3:
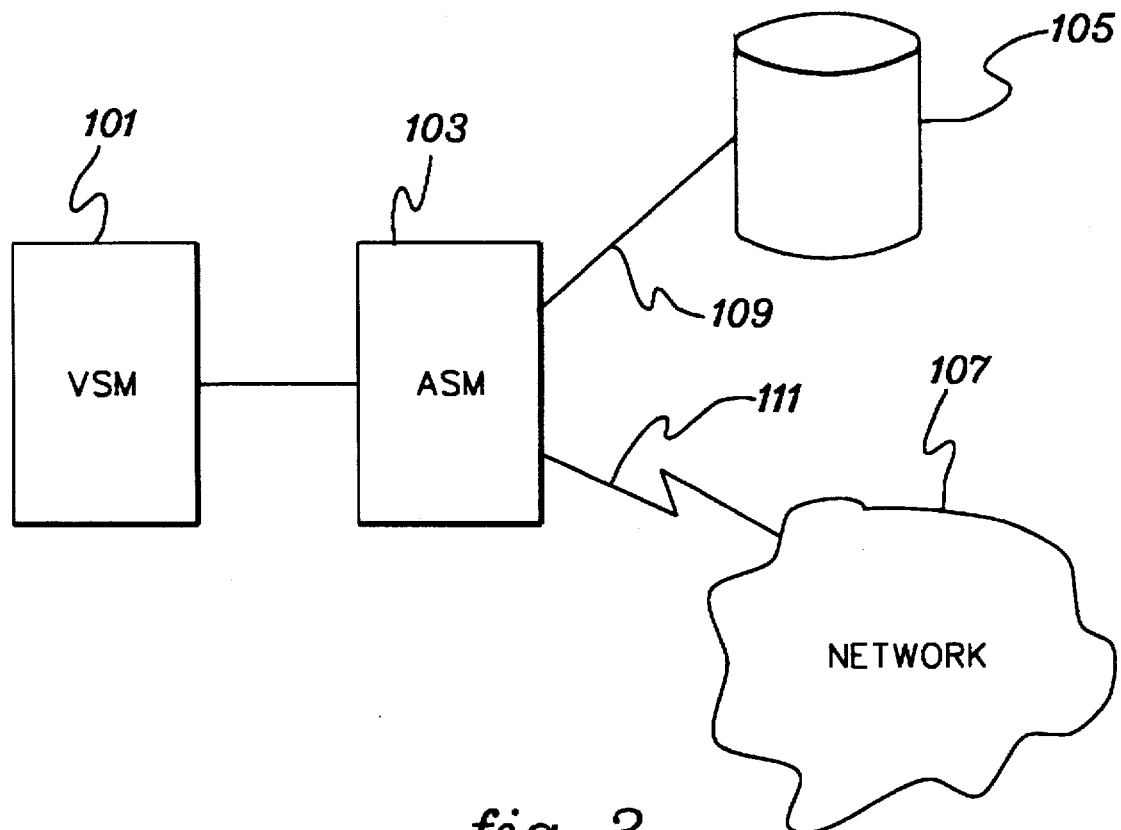
FIG. 3 is a diagram of computer system elements used for memory paging in connection with one embodiment of the present invention.
Figure 5:
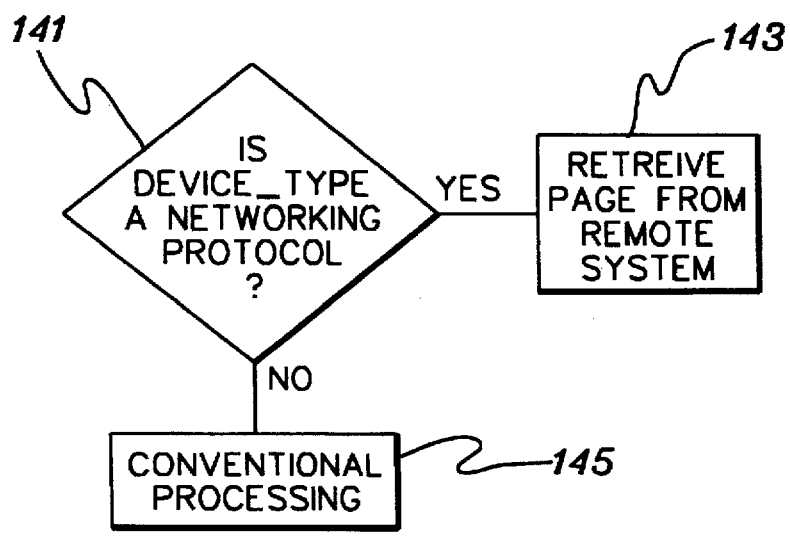
FIG. 5 is a flow-diagram of target computer Auxiliary Storage Manager processing pursuant to one embodiment of the present invention.

Shown in FIG. 3 is one example of the computer system elements involved in virtual memory processing. A virtual storage manager ("VSM") 101 handles virtual memory processing including, e.g., performing virtual memory allocation/deallocation, servicing page faults and coordinating access to virtual memory from various tasks. Coupled to VSM 101 is an Auxiliary Storage Manager ("Auxiliary Storage Manager") 103 that controls the transfer of memory pages between real storage (e.g., system random access memory) and external paging storage. External paging storage is provided on external paging devices such as, e.g., disk storage 105 and a remote paging device available on a network 107. Disk storage 105 may comprise, e.g., a local Small Computer System Interface ("SCSI") hard disk connected to the computer system through a SCSI interface 109. Network 107 may comprise, e.g., a Transmission Control Protocol/Internet Protocol ("TCP/IP") network connected to the computer system through, e.g., a token ring interface 111.

The particular implementation of VSM 101 and Auxiliary Storage Manager 103 will vary based upon the particular computer system and operating system used. As examples, on an "IBM ES/9000" class computer executing an "MVS" operating system, the VSM and Auxiliary Storage Manager are components of "MVS". On other systems, VSM and Auxiliary Storage Manager functionality may be combined into a single software component (e.g., the VSM). For example, on an "INTEL" processor based "IBM" personal computer platform executing the "IBM OS/2 WARP" operating system, the VSM and Auxiliary Storage Manager are implemented as a single integral part of the operating system.

During operation, the Auxiliary Storage Manager maintains a look-up table 121 (FIG. 4) of virtual memory page records used to locate virtual memory pages on external paging devices (e.g., disk 105). The look-up table includes several fields for each memory page including:

ASID (123)—Address Space Identifier—This is an identifier of the particular address space that the virtual memory pages are stored in. In computer systems which do support multiple address spaces, this parameter would be omitted.

PAGE_ADDRESS (125)—The memory address of the subject virtual memory page.

DEVICE_TYPE (127)—The type of external paging device that the subject virtual memory page is stored on.

DEVICE_# (129)—The identifying number of the device type (i.e., there may be several of the same device type available).

DEVICE_LOCATION (131)—A pointer to the location of the subject memory page on the device.

As one example, a first virtual memory page 133 is associated with application program number 0001 and has an address of FF3C8 (hexidecimal). First virtual memory page 133 is stored on a SCSI hard disk with a device address of 001, and is located on the hard disk at record number 1728 (within, e.g., a paging file).

The retrieval of virtual memory pages from a remote computer (e.g., the source computer) is facilitated by the inclusion of virtual memory page records in look-up table 121 that correspond to memory pages on a remote computer.

For example, virtual memory page 135 is associated with application program number 0017 and has an address of ABD00 (hexidecimal). The device type is "TCP/IP", the name of a networking protocol, thus informing the Auxiliary Storage Manager that virtual memory page 135 is to be retrieved from a remote source computer using TCP/IP as the networking protocol. A device number of 1.2.3.4 is provided and comprises the TCP/IP address of the remote computer. Other networking protocols are similarly supported. In this embodiment the DEVICE_LOCATION field is not needed; however, in some communications protocols, further addressing information may be required and could be stored in the DEVICE_LOCATION field.

When processing a request for a virtual memory page from an external device (FIG. 5), the Auxiliary Storage Manager checks the DEVICE_TYPE field in the Auxiliary Storage Manager look-up table to determine whether a networking protocol is referenced (inquiry 141). If a networking protocol is referenced, the memory page is retrieved from a remote system (step 143), as described herein. If a networking protocol is not referenced, then conventional processing ensues (step 145—e.g., retrieval of the subject memory page from a local hard disk).

Figure 6:
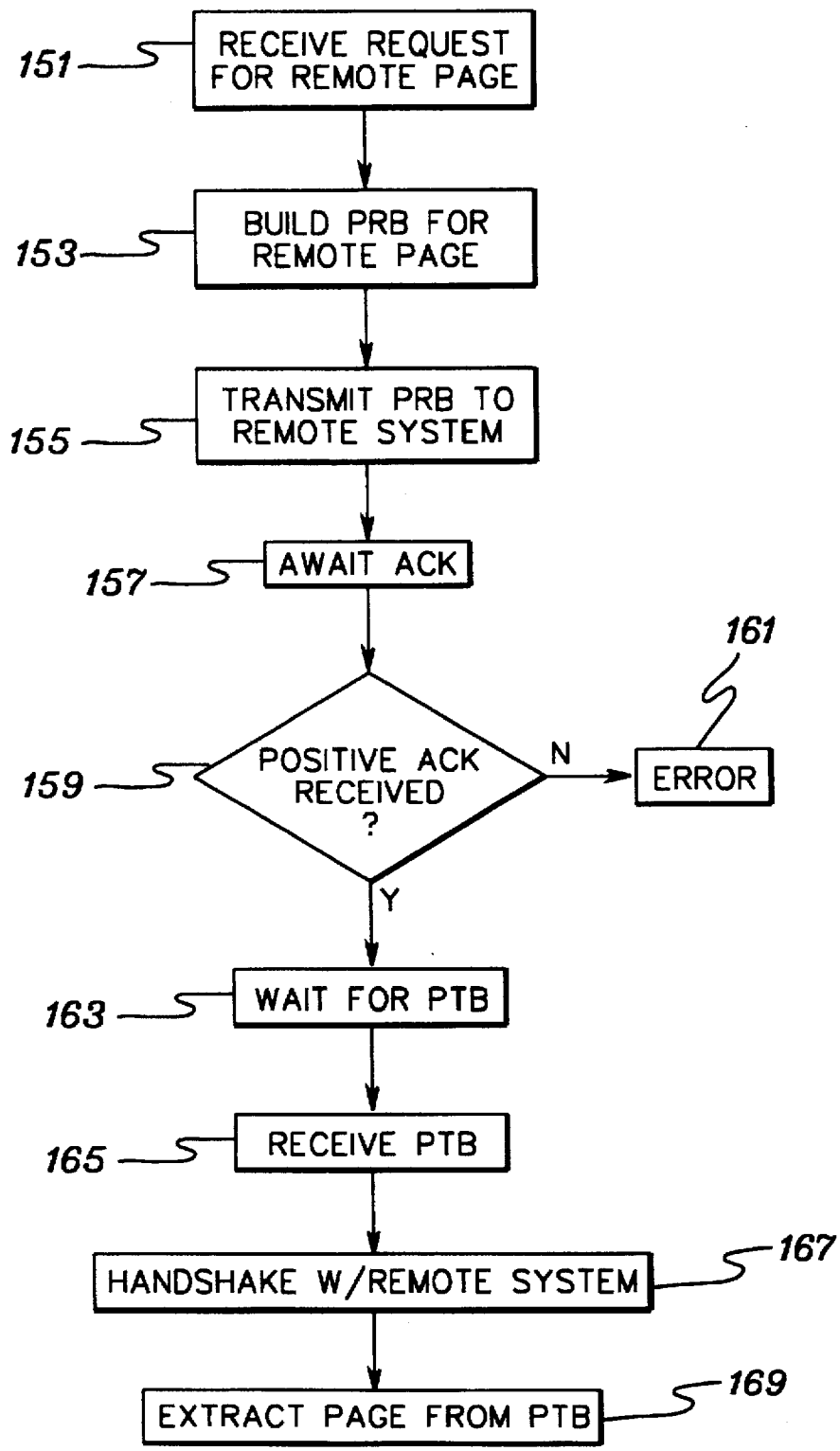
FIG. 6 is a flow-diagram of target computer remote page retrieval processing in conformance with an embodiment of the present invention.

One example of the steps used by the target computer system to retrieve a page of virtual memory from the source computer system is depicted in FIG. 6 and described in detail below. As a first step, a request for a page of virtual memory stored on the source computer system arises (step 151). In response to this request, a Page Request Block ("PRB") is assembled for transmission to the source computer system (step 153) and is transmitted (step 155).

Figure 8:
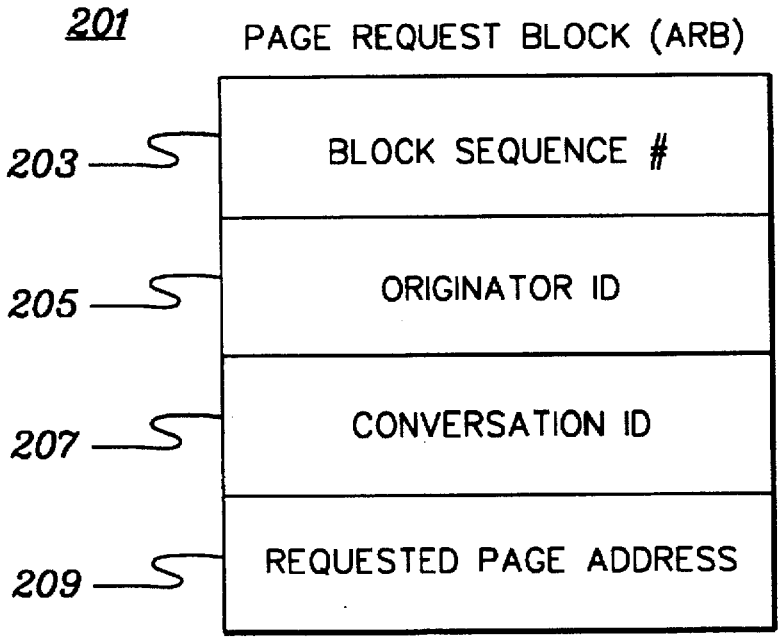
FIG. 8 is a diagram of one example of a page request block ("PRB")

An example format of a PRB 201 is shown in FIG. 8 and includes the following fields:

BLOCK SEQUENCE # (203)—A reference number used in a conventional sequencing mechanism for tracking and differentiating between PRBs sent to the same source computer.

ORIGINATOR ID (205)—The network address of the target computer (e.g., a TCP/IP address of 1.2.3.4). (This parameter may be deleted if it can be obtained directly from the communication stack).

CONVERSATION ID (207)—A reference number used in conventional communications mechanisms for tracking and differentiating conversations between different programs.

REQUESTED PAGE ADDRESS (209)—The memory address of the requested page of virtual memory. The source computer uses this address to locate and retrieve the requested memory page.

To continue with the process of FIG. 6, the target computer system awaits an acknowledgement that the PRB has been received by the source computer system (step 157), and indicates that the PRB has been accepted (inquiry 159). This acknowledgement includes conventional network protocol checks such as, e.g., checksums, and further includes a verification that the requested page of virtual memory is stored on the source computer. If a positive acknowledgement is not received, an error is processed (step 161). Depending on the criticality of the error, different processing may result. For example, if the requested page of memory is not present on the source computer, the transfer is not possible and is aborted. If, however, a network transmission error occurred, conventional retransmission processing is performed.

After PRB transmission, the target computer awaits receipt of a Page Transmission Block ("PTB"—step 163) that contains the requested memory page. (The PTB is described further hereinbelow with respect to FIGS. 7 & 9). The PTB is received (step 165) and appropriate handshaking acknowledging the receipt thereof is performed with the remote system (step 167). If the PTB is not received after a predetermined time, or is received having errors, conventional retransmission processing is performed.

The received PTB is processed and the requested virtual memory page (or pages) is extracted from it (step 169). This virtual memory page is then transferred to the VSM of the target computer where it is used to remediate the page fault that initiated the remote page retrieval process.

Figure 7:
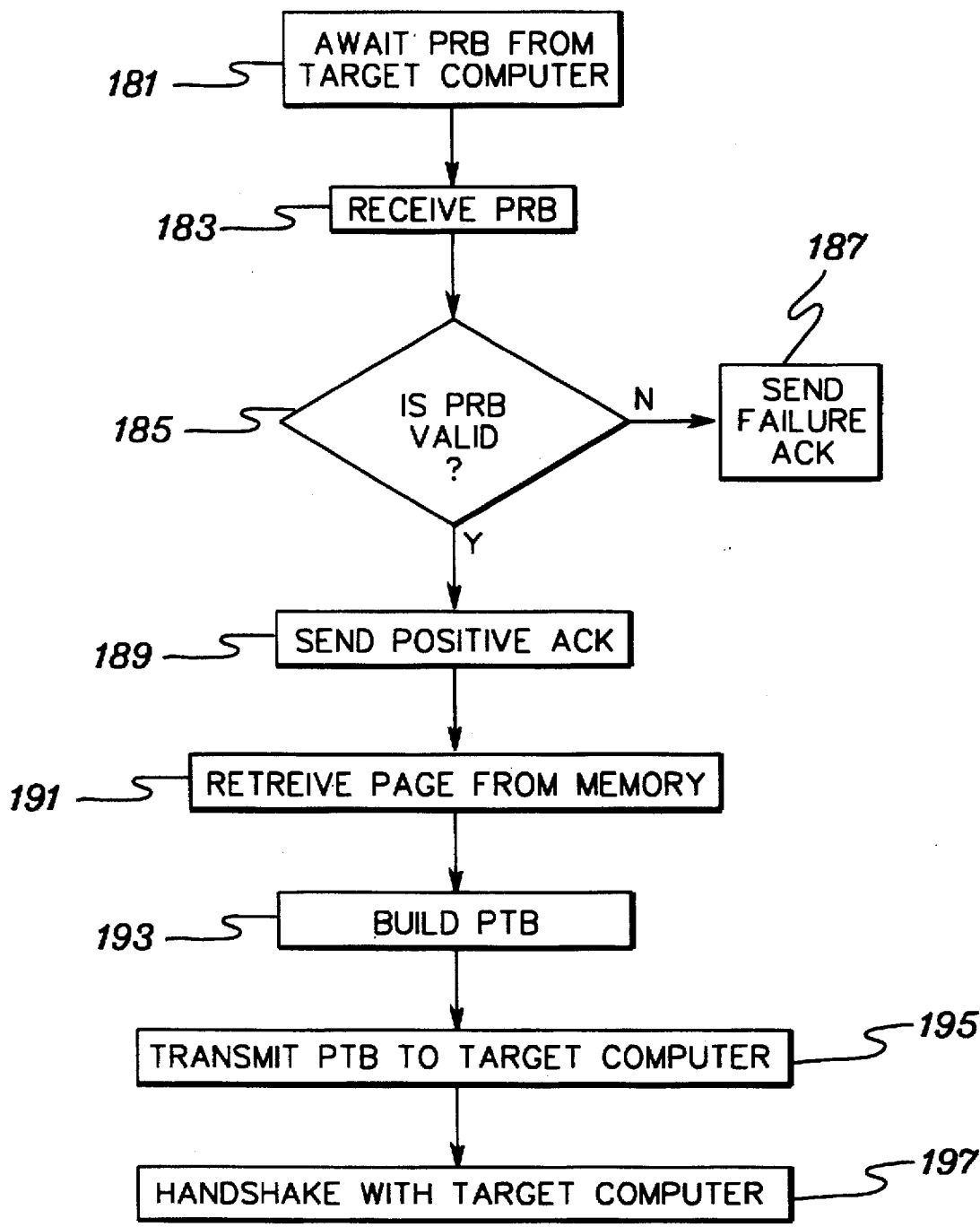
FIG. 7 is a flow-diagram of source computer remote page supply processing in accordance with one embodiment of the present invention.

Complementary to the retrieval process described above is a process by which the source computer supplies pages of memory to the target computer upon request. One example of this process is depicted in FIG. 7 and is described in detail below. The source computer awaits PRBs from the target computer (step 181) and eventually receives a PRB. The received PRB is checked to insure that the requested page is available on the source computer (inquiry 185), and if unavailable, an indicative acknowledgment is sent to the target computer (step 187) and this invocation of the page supply process terminates. The test to determine if the requested page is available is performed by checking the prepared data maintained by the source computer. If the requested page is available, a positive acknowledgement is transmitted to the target computer (step 189).

The steps depicted in FIG. 7 are implemented within the source computer using, for example, a "sender program" executing therein. The sender program is bound to the networking protocol running within the source computer, and receives requests for memory pages from the target computer. In one example, in a TCP/IP environment, this program may be implemented using RPCs ("Remote Procedure Calls"). Implementation of such a sender program and the binding thereto to a communications protocol executing within the source computer will be apparent to one of ordinary skill in the art in view of this disclosure.

To continue, the requested page is retrieved from memory (step 191) and is assembled into a PTB (step 193). After assembly, the PTB is transmitted to the target computer (step 195) and appropriate communications handshaking is performed (step 197). The process is then complete.

Figure 9:
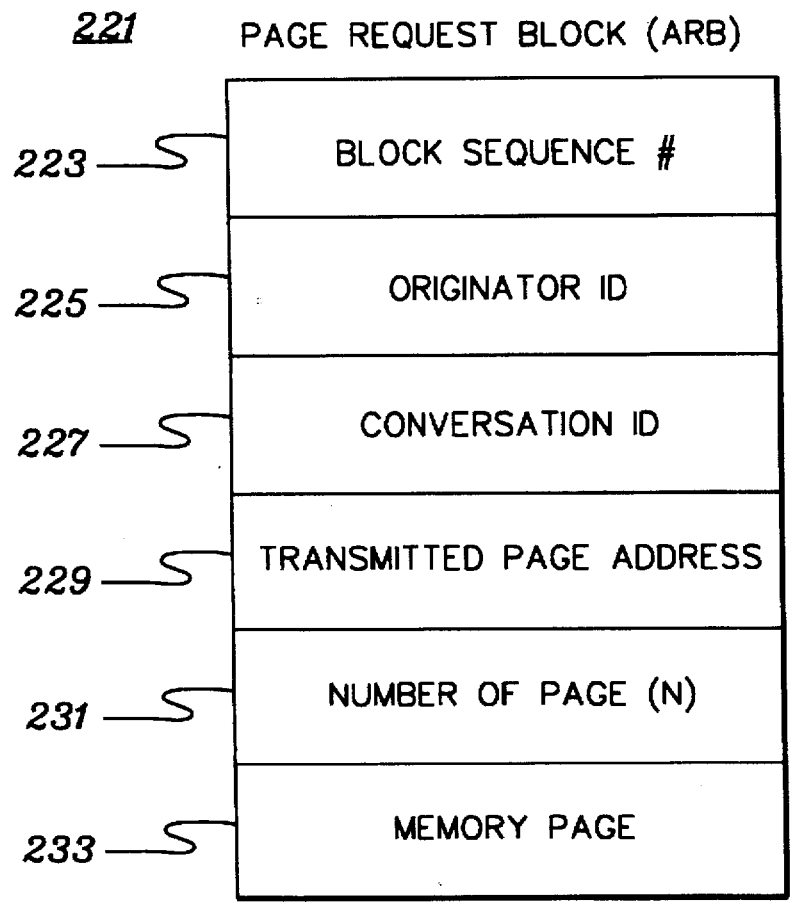
FIG. 9 is a diagram of one example of a page transmission block ("PTB")

An example format of a PTB 221 is shown in FIG. 9 and includes the following fields:

BLOCK SEQUENCE # (223)—A reference number used in a conventional sequencing mechanism for tracking and differentiating between PRBs sent to the same source computer. The BLOCK SEQUENCE # of the PTB will match that of the requesting PRB.

ORIGINATOR ID (225)—The network address of the target computer (e.g., a TCP/IP address of 1.2.3.4). (This parameter may be deleted if it can be obtained directly from the communication stack).

CONVERSATION ID (227)—A reference number used in conventional communications mechanisms for tracking and differentiating conversations between different programs.

TRANSMITTED PAGE ADDRESS (229)—The memory address of the transmitted page of virtual memory.

MEMORY PAGE (233)—The memory page itself.

To summarize, the techniques of the present invention facilitate a new and useful mechanism for efficiently transferring computer code from a first computer to a second computer. Pages are linked on the source computer such that their addressing corresponds to an allocated virtual memory space on the target computer. As the target computer requires the pages, they are transmitted. Thus, since transfer of memory pages is performed on-demand, bandwidth is conserved and long waiting periods necessary for the transfer of an entire program are obviated. These techniques are particularly useful in transferring application programs as it is possible for the source computer to execute the desired application program, and concurrently act as an external paging device for a target computer also executing the application program. In accordance with this new functionality and increased efficiency, the present invention comprises an advancement in software transmission techniques.

As one implementation example, the techniques of the present invention can be used to enhance the "HOT JAVA" (a product of work conducted by "SUN MICROSYSTEMS") extensions to world wide web browser technology. The techniques of the present invention enable the establishment of an executable program network server. This server could process multiple requests from numerous remote users, thereby eliminating the need for those users to do their own program loads.

The present invention is not limited to any particular operating environment. The computers may comprise any type of computer that may be interconnected. By way of example, reference is made to an "IBM" personal computer executing an "OS/2 WARP" operating system. Network connectivity may be provided over a Local-Area or Wide-Area Network (e.g., "TOKEN-RING", "INTERNET", "FIBER DISTRIBUTED DATA INTERCHANGE"—"FDDI", "ASYNCHRONOUS TRANSFER MODE"—"ATM", etc.) using any networking protocol (e.g., "TCP/IP", "IPX", "NETBIOS").

Described above are examples of techniques for on-demand software distribution. It will be apparent to those of ordinary skill in the art that the above-described flows and sequences of steps are only examples. There can be many variations to the above, including, for instance, processing more or less than the steps described above, modifying one or more of the steps, or changing the order of some of the steps without departing from the true spirit and scope of the present invention. These variations are, therefore, considered a part of the claimed invention.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. A method for use in transferring computer code from a source computer to a target computer for execution, said source computer being coupled to said target computer, said method comprising:
   (a) requesting transfer of said computer code from said source computer to said target computer; and
   (b) in response to said requesting, providing said source computer with an image of said computer code, said image being of paged out computer code although said computer code was not paged out and said image being pageable in by said target computer.

2. The method of claim 1, wherein said source computer comprises an object code version of said computer code, and wherein said providing comprises linking said object code version of said computer code on said source computer to provide said image of said computer code that is pageable in by said target computer.

3. The method of claim 2, wherein said linking comprises linking said object code version of said computer code wherein said image comprises addressing corresponding to a predesignated region of memory within said target computer.

4. The method of claim 3, further comprising said source computer retrieving a starting address of said predesignated region of memory within said target computer, and using said starting address during said linking.

5. The method of claim 1, further comprising beginning execution of a portion of said computer code on said target computer prior to receipt of all of said computer code, said beginning execution comprising on-demand paging in of the image of said computer code by said target computer from said source computer.

6. The method of claim 5, wherein said executing comprises transferring all of said image to said target computer, said transferring comprising giving priority to pages of said image corresponding to page faults encountered during said executing.

7. The method of claim 6, wherein said transferring comprises sequentially transferring all of said image to said target computer, one page at a time, and if a page fault occurs during said executing, transferring a selected page to said target computer, said selected page resolving said page fault.

8. The method of claim 5, further comprising completing execution of any needed portion of said computer code prior to receipt of said entire computer code.

9. The method of claim 8, further comprising continuing transmission of any remaining computer code subsequent to completing execution of any of said needed portions of said computer code or aborting transmission of any remaining computer code.

10. A method for transferring computer code from a source computer to a target computer, said target computer being coupled to said source computer and comprising a virtual storage manager, said method comprising:
   (a) allocating, on said target computer, virtual memory space corresponding to said computer code, said virtual memory space comprising a plurality of pages of memory;
   (b) storing an executable version of said computer code in a memory of said source computer, said executable version having addressing corresponding to said virtual memory space of said target computer; and
   (c) accessing, on said target computer, said virtual memory space, said virtual storage manager transferring portions of said executable version from said source computer to said target computer as page faults occur on said target computer during said accessing.

11. The method of claim 10, further comprising informing said virtual storage manager of said target computer that pages of said executable version are stored on said source computer.

12. The method of claim 11, wherein said accessing comprises:
   executing said executable version on said target computer and encountering a page fault during said execution; and
   in response to said page fault, said virtual storage manager requesting a selected page of said executable version from said source computer, said selected page curing said page fault.

13. The method of claim 12, wherein said accessing comprises obtaining an address of said source computer and transmitting a page request block ("PRB") to said source computer using said address, said PRB specifying said selected page.

14. The method of claim 13, wherein said accessing further comprises awaiting a page transmission block ("PTB") from said source computer, said PTB comprising a response to said PRB and including said selected page.

15. The method of claim 10, further comprising said source computer executing a source computer version of said computer code during said accessing.

16. The method of claim 10, further comprising said target computer sending a permission inquiry to said source computer to determine if said target computer may retrieve said computer code from said source computer.

17. The method of claim 16, wherein said accessing is only performed if said source computer responds with affirmative permission in response to said permission inquiry from said target computer.

18. A system for use in transferring computer code from a source computer to a target computer for execution, said source computer being coupled to said target computer, said system comprising:

means for requesting transfer of said computer code from said source computer to said target computer;

means for, in response to said requesting, providing said source computer with an image of said computer code, said image being of paged out computer code although said computer code was not paged out and said image being pageable in by said target computer.

19. The system of claim 18, wherein said source computer comprises an object code version of said computer code, and wherein said means for providing comprises means for linking said object code version of said computer code on said source computer to provide said image of said computer code that is pageable in by said target computer.

20. The system of claim 19, wherein said means for linking comprises means for linking said object code version of said computer code wherein said image comprises addressing corresponding to a predesignated region of memory within said target computer.

21. The system of claim 20, further comprising means for said source computer retrieving a starting address of said predesignated region of memory within said target computer, and using said starting address during said linking.

22. The system of claim 18, further comprising means for beginning execution of a portion of said computer code on said target computer prior to receipt of all of said computer code, said beginning execution comprising on-demand paging in of the image of said computer code by said target computer from said source computer.

23. The system of claim 22, wherein said means for executing comprises means for transferring all of said image to said target computer, said transferring comprising giving priority to pages of said image corresponding to page faults encountered during said executing.

24. The system of claim 23, wherein said means for transferring comprises means for sequentially transferring all of said image to said target computer, one page at a time, and if a page fault occurs during said executing, transferring a selected page to said target computer, said selected page resolving said page fault.

25. A system for transferring computer code from a source computer to a target computer, said target computer being coupled to said source computer and comprising a virtual storage manager, said system comprising:

means for allocating, on said target computer, virtual memory space corresponding to said computer code, said virtual memory space comprising a plurality of pages of memory;

means for storing an executable version of said computer code in a memory of said source computer, said executable version having addressing corresponding to said virtual memory space of said target computer; and means for accessing, on said target computer, said virtual memory space, said virtual storage manager transferring portions of said executable version from said source computer to said target computer as page faults occur on said target computer during said accessing.

26. The system of claim 25, further comprising means for informing said virtual storage manager of said target computer that pages of said executable version are stored on said source computer.

27. The system of claim 26, wherein said means for accessing comprises means for executing said executable version on said target computer and encountering a page fault during said execution, in response to said page fault, said virtual storage manager requesting a selected page of said executable version from said source computer, said selected page curing said page fault.

28. The system of claim 27, wherein said means for accessing further comprises means for obtaining an address of said source computer and means for transmitting a page request block ("PRB") to said source computer using said address, said PRB specifying said selected page.

29. The system of claim 28, wherein said means for accessing further comprises means for awaiting a page transmission block ("PTB") from said source computer, said PTB comprising a response to said PRB and including said selected page.

30. The system of claim 25, further comprising means for said source computer executing a source computer version of said computer code during operation of said means for accessing.

31. The system of claim 25, further comprising means for said target computer sending a permission inquiry to said source computer to determine if said target computer may retrieve said computer code from said source computer.

32. The system of claim 31, wherein said means for accessing only operates if said source computer responds with affirmative permission in response to said permission inquiry from said target computer.

33. A method for transferring virtual memory pages to a computer from a paging device, said paging device being coupled to said computer, said method comprising:

(a) storing at least one virtual memory page for said computer on said paging device, said at least one virtual memory page having not been previously paged out by said computer; and (b) paging in said at least one virtual memory page to said computer from said paging device.

34. The method of claim 33, wherein said computer comprises a target computer and said paging device comprises a source computer, and wherein said storing comprises linking a program on said source computer to create said at least one virtual memory page stored on said source computer.

35. The method of claim 34, wherein said linking comprises linking said at least one virtual memory page, wherein said at least one virtual memory page has addressing corresponding to a pre-designated region of memory within said target computer.

36. A system for transferring virtual memory pages to a computer from a paging device, said paging device being coupled to said computer, said system comprising:

means for storing at least one virtual memory page for said computer on said paging device, said at least one virtual memory page having not been previously paged out by said computer; and means for paging in said at least one virtual memory page to said computer from said paging device.

37. The system of claim 36, wherein said computer comprises a target computer and said paging device comprises a source computer, and wherein said means for storing comprises means for linking a program on said source computer to create said at least one virtual memory page stored on said source computer.

38. The system of claim 37, wherein said means for linking comprises means for linking said at least one virtual memory page, wherein said at least one virtual memory page has addressing corresponding to a pre-designated region of memory within said target computer.

* * * * *